(12) United States Patent
Scheer

(10) Patent No.: US 12,726,009 B2
(45) Date of Patent: Sep. 1, 2026

(54) TRAY CONNECTIONS WITH COMPACT WIRE ROUTING FOR CONVERTIBLE AIRCRAFT CARGO HANDLING SYSTEMS

(71) Applicant: GOODRICH CORPORATION, Charlotte, NC (US)

(72) Inventor: Dustin P. Scheer, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 540 days.

(21) Appl. No.: 18/309,602

(22) Filed: Apr. 28, 2023

(65) Prior Publication Data

US 2024/0364089 A1 Oct. 31, 2024

(51) Int. Cl.
*H02G 3/38* (2006.01)
*B64D 9/00* (2006.01)

(52) U.S. Cl.
CPC ............... *H02G 3/283* (2013.01); *B64D 9/00* (2013.01); *B64D 2009/006* (2013.01); *B64D 2221/00* (2013.01)

(58) Field of Classification Search
CPC ...... B65G 21/06; H02G 3/0608; H02G 3/283; B64D 9/003; B64D 9/00; B64D 2009/006; B64D 2221/00
See application file for complete search history.

(56) References Cited

U.S. PATENT DOCUMENTS 3,262,588 A 7/1966 Davidson
3,377,040 A * 4/1968 Hansen .................. B64D 9/003 410/79
3,778,012 A * 12/1973 Fernandez ............ B60P 7/0815 193/40
7,429,157 B2 * 9/2008 Schulze ................. B64D 9/003 410/80
7,731,460 B2 * 6/2010 Brown ...................... B60P 7/13 410/80
10,522,990 B1 12/2019 Klein
10,787,260 B2 9/2020 Scheer et al.
2012/0132744 A1 5/2012 Huber et al.
2020/0239122 A1 7/2020 Scheer et al.
2020/0239123 A1 7/2020 Stegmiller et al.
2023/0116108 A1 4/2023 Widmer et al.

FOREIGN PATENT DOCUMENTS

DE 102010017535 B4 * 10/2018 ............. B64D 9/003

OTHER PUBLICATIONS

European Patent Office, European Search Report dated Jun. 28, 2024 in Application No. 24173165.2.

* cited by examiner

*Primary Examiner* — Abdullah A Riyami

(74) *Attorney, Agent, or Firm* — SNELL & WILMER L.L.P.

(57) ABSTRACT

A quick attach splice is provided. The quick attach splice includes a first side rail, a second side rail parallel to the first side rail, a cross member extending from the first side rail to the second side rail, a first pin extending from within the cross member and through at least one of the first side rail or the second side rail, a tab configured to retract the first pin, and a roller extending from the first side rail to the second side rail.

16 Claims, 8 Drawing Sheets

TRAY CONNECTIONS WITH COMPACT WIRE ROUTING FOR CONVERTIBLE AIRCRAFT CARGO HANDLING SYSTEMS

FIELD

The present disclosure relates to cargo handling systems, and more specifically, to tray connections with compact wire routing for convertible aircraft cargo handling systems.

BACKGROUND

Today's rapidly evolving and uncertain world has driven the need for increased flexibility and modularity into modern aircraft cargo handling systems. The response to these requirements has led to the development of many "convertible" cargo handling systems that can be easily reconfigured to handle many different mission profiles including bulk cargo, passengers, containerized cargo, additional fuel tanks, etc. One typical implementation of this type of system utilizes discrete floor fittings attached to an aircraft structure to provide standardized quick-attach interfaces for the cargo system components.

SUMMARY

A quick attach splice is disclosed. The quick attach splice includes a first side rail, a second side rail that is parallel to the first side rail, a cross member extending from the first side rail to the second side rail, a first pin extending from within the cross member and through at least one of the first side rail or the second side rail, a tab configured to retract the first pin, and a roller extending from the first side rail to the second side rail.

In various embodiments, the quick attach splice further includes a base including a first side structure and a second side structure, and a first hole formed in at least one of the first side structure or the second side structure and configured to receive the first pin. In various embodiments, the quick attach splice further includes a second cross member extending between the first side rail and the second side rail, and a second pin extending from within the second cross member, at least one of the first side rail or the second side rail, and into a second hole formed in at least one of the first side structure or the second side structure and configured to receive the second pin, where the first side rail and the second side rail pivot about the second cross member.

In various embodiments, the quick attach splice further includes a base including a first side structure and a second side structure, where a first proximal end of the first side rail is affixed to the first side structure and where a second proximal end of the second side rail is affixed to the second side structure. In various embodiments, each of a first distal end of the first side rail and a second distal end of the second side rail include a notch. In various embodiments, the quick attach splice further includes a second cross member extending between the first side rail to the second side rail, and a second pin extending from within the second cross member and through at least one of the first side rail or the second side rail.

In various embodiments, the tab is a spring-loaded tab biasing the first pin to an extended position. In various embodiments, the quick attach splice further includes a second pin extending from within the cross member and through at least one of the first side rail or the second side rail of which the first pin is not extending. In various embodiments, the quick attach splice, further includes a connector shield, where the connector shield is coupled to at least one of the first side rail or the second side rail and is configured to pivot to allow access to one or more connectors when the quick attach splice is in a raised position and protect the one or more connectors when the quick attach splice is in a lowered position. In various embodiments, the quick attach splice further includes a connector shield, where the connector shield is at least one of permanently or non-permanently coupled to at least one of the first side rail or the second side rail and is configured to slide to allow access to one or more connectors when the quick attach splice is in an unattached position and protect the one or more connectors when the quick attach splice is in an attached position.

Also disclosed herein is a cargo handling system. The cargo handling system includes a first tray having a first end, a second tray having a second end, and a quick attach splice configured the connect the first end to the second end. The quick attach splice includes a first side rail, a second side rail that is parallel to the first side rail, a cross member extending from the first side rail to the second side rail, a first pin extending from within the cross member and through at least one of the first side rail or the second side rail, a tab configured to retract the first pin, and a roller extending from the first side rail to the second side rail.

In various embodiments, the first tray includes a first side structure, a second side structure, and a first hole formed in at least one of the first side structure of the first tray or the second side structure of the first tray and configured to receive the first pin. In various embodiments, the quick attach splice further includes a second cross member extending between the first side rail and the second side rail, and a second pin extending from within the second cross member, through at least one of the first side rail or the second side rail, and into a second hole formed in at least one of the first side structure or the second side structure and configured to receive the second pin, where the first side rail and the second side rail pivot about the second cross member. In various embodiments, the quick attach splice further includes a second cross member extending from the first side rail to the second side rail, and a second pin extending from within the second cross member, through the first side rail, and into a second hole in the second tray, where the first pin is configured to lock into the first tray and the second pin is configured to lock into the second tray.

In various embodiments, the first tray includes a first side structure, and a second side structure, where a first proximal end of the first side rail is affixed to the first side structure of the first tray and where a second proximal end of the second side rail is affixed to the second side structure of the first tray. In various embodiments, the second tray includes a first side structure, and a second side structure, where each of a first distal end of the first side rail and a second distal end of the second side rail include a notch configured to couple to a second cross member extending between the first side rail of the second tray and the second side structure of the second tray. In various embodiments, the quick attach splice further includes a second cross member extending between the first side rail to the second side rail, and a second pin extending from within the second cross member, the at least one of the first side rail or the second side rail, and into a first hole in the second tray.

In various embodiments, the tab is a spring-loaded tab biasing the first pin to an extended position. In various embodiments, the quick attach splice further includes a connector shield, where the connector shield is coupled to at least one of the first side rail or the second side rail and is configured to pivot to allow access to one or more connectors when the quick attach splice is in a raised position and protect the one or more connectors when the quick attach splice is in a lowered position. In various embodiments, the quick attach splice further includes a connector shield, where the connector shield is at least one of permanently or non-permanently coupled to at least one of the first side rail or the second side rail and is configured to slide to allow access to one or more connectors when the quick attach splice is in an unattached position and protect the one or more connectors when the quick attach splice is in an attached position.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
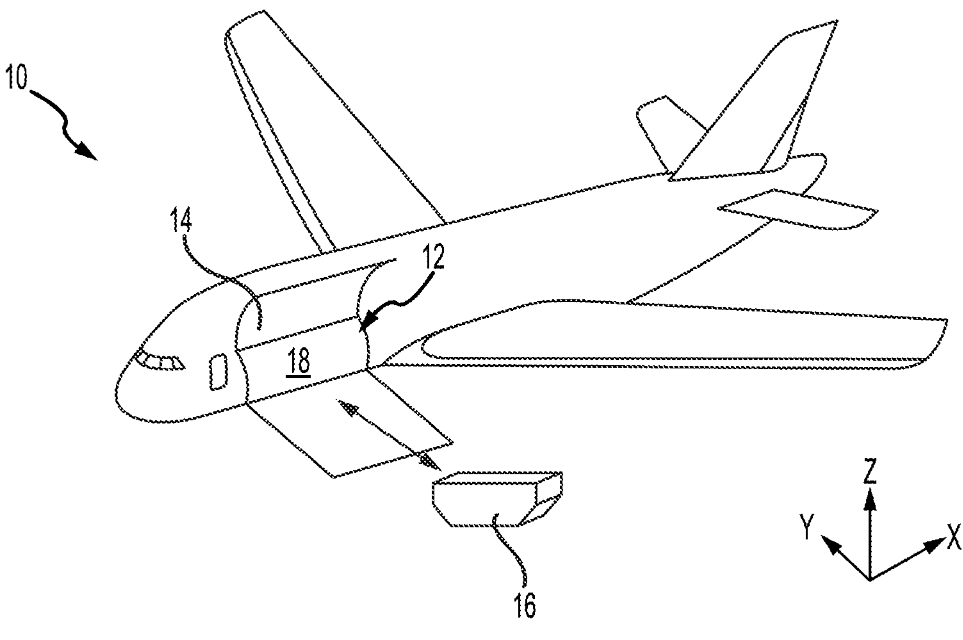
FIG. 1 illustrates a schematic view of an aircraft being loaded with cargo, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

In typical convertible cargo handling systems the quick-attach scheme attaching the roller trays to the floor fittings provides for easy install/uninstall/upgrade of the convertible cargo handling system when desired. In addition to the floor fittings, the convertible cargo handling systems also uses quick-connect attachment mechanisms between components within the system. One such attachment mechanism is a splice mechanism used to join two separate roller trays.

A first issue with typical splice mechanisms is an amount of space such splice mechanisms occupy within the roller tray. In typical cargo systems, the roller trays hold several different types of components such as power drive units (PDUs), restraints, rollers, or floor fittings, among others. Fitting all these components into a roller tray while maintaining a proper pitch between rollers may become a complicated task, especially in a narrowbody cargo system where there is only one lane of roller trays. To aid in layout process for a roller tray it is advantageous for these components to occupy the least amount of space possible in the roller tray. Typical splice mechanisms may not be optimized for length, especially when roller trays are installed in a sliding process that use tension straps adjacent to the splice to ensure that the walls of the roller tray do not split apart when the splice is loaded, which may cause slide pins associated with the splice mechanism to become disengaged.

Another issue with typical splice mechanisms is associated with above-floor wiring that is mounted to the roller trays that the splice mechanisms are joining. With a wire harnesses attached to the roller trays, a break in those roller trays may be in need of a set of mating connectors to allow disconnection of the wire harness. Typical splice mechanisms may not provide a reasonable mechanism for mounting such mating connectors and wiring harnesses and protecting these mating connectors and wiring harnesses from damage.

A cargo system may have harsh and abusive operating conditions. Thus, it is not desirable to have protruding members from the roller trays that may allow snagging or other damage. Typical splice mechanisms do not allow for a mounting scheme that fully avoids this concern without adding considerable expense.

Disclosed herein are improved tray connections with compact wire routing for use with a convertible cargo handling system. In various embodiments, an improved splice mechanism provide for an additional roller that may reduce concerns associated with adequate roller pitch in the convertible cargo handling system. In various embodiments, space created by biasing the improved splice mechanism to one side of the track allows for a larger, less expensive, and more commercially available mating connector to be utilized without the mating connector protruding outside the roller tray, thereby reducing a risk of damage to the mating connection and/or the wiring harness associated with the mating connector. In various embodiments, although a pivoting splice mechanism may be attached to either of the two roller trays that are to be coupled together, having the pivoting splice mechanism attached to a same side as a free-floating mating connector is advantageous because an additional connector shield provides additional protection during transportation and storage. In various embodiments, having the connector shield retained on the same side with the free connector end is advantageous because the connector shield acts to capture the free end during storage/transport, which may also ensure that the connector shield is not lost during transportation and storage. In various embodiments, the improved splice mechanism may also protect external connections from the harness to a roller tray structure. In that regard, in various embodiments, some wiring harnesses use ground connections to be connected directly to the roller tray structure. Accordingly, in various embodiments, the connector shield may protect such ground connections.

With reference to FIG. 1, an aircraft 10 is illustrated having a cargo compartment 12. A cargo door 14 provides access to cargo compartment 12 from outside the aircraft 10. Cargo 16 (e.g., pallets, ULDs, luggage, etc.) may be loaded and unloaded through cargo door 14 and onto a cargo deck 18 of aircraft 10. In various embodiments, cargo deck 18 of the cargo system may be equipped with one or more power drive units (PDUs) configured to propel the cargo 16 across cargo deck 18 in a desired direction.

Figure 2A:
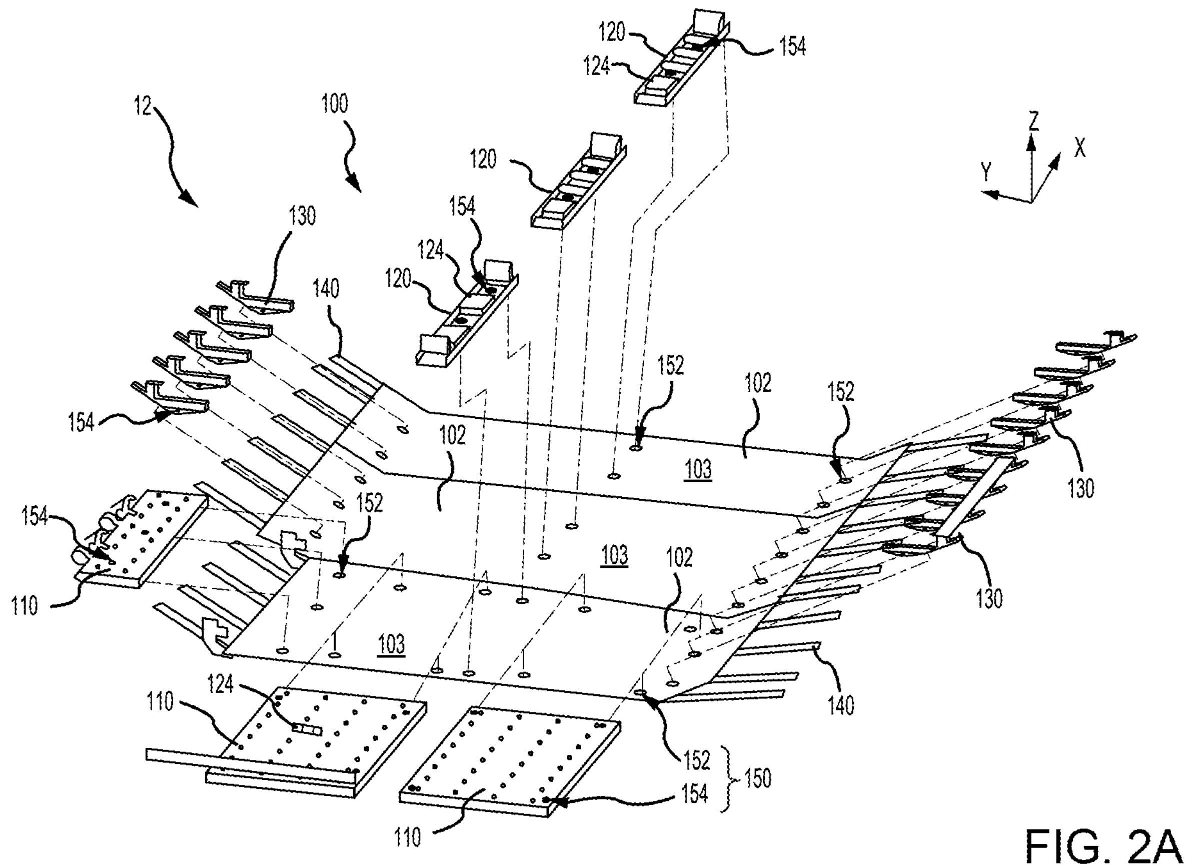
FIG. 2A illustrates an assembly view of a convertible cargo handling assembly, in accordance with various embodiments.
Figure 2B:
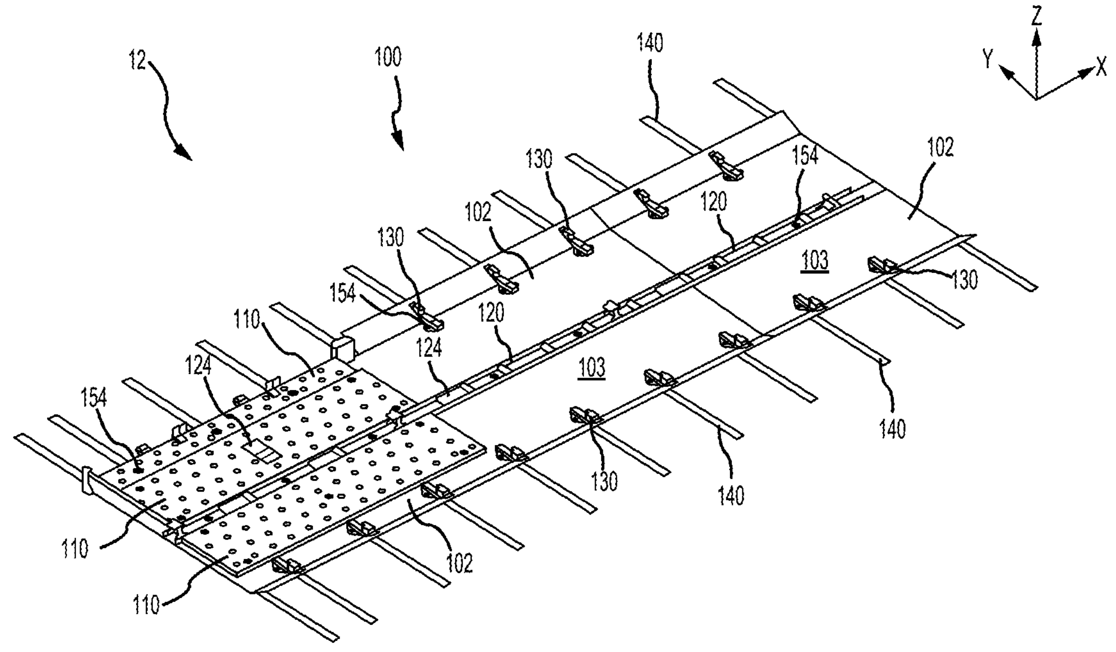
FIG. 2B illustrates a convertible cargo handling assembly configured for handling containerized cargo, in accordance with various embodiments.

With reference to FIGS. 2A and 2B, a convertible cargo handling assembly 100, which may be located within cargo compartment 12, is illustrated. In accordance with various embodiments, convertible cargo handling assembly 100 may be converted between a containerized mode (FIG. 2B), configured to handle containerized cargo, and a bulk mode for handling bulk cargo items individually. Convertible cargo handling assembly 100 comprises a plurality of floor panels, or panels 102. Panels 102 may line the cargo compartment 12. For example, panels 102 are located along the floor and walls of cargo compartment 12. Panels 102 are located over aircraft frame structures 140. In this regard, panels 102 may form the cargo deck 18, with momentary reference to FIG. 1. In various embodiments, convertible cargo handling assembly 100 includes components configured to facilitate translation of containerized cargo over panels 102. For example, convertible cargo handling assembly 100 may include ball mats 110, roller trays 120, and guide rails 130. Ball mats 110 may be located proximate cargo door 14, with momentary reference to FIG. 1. Convertible cargo handling assembly 100 may be equipped with one or more power drive units (PDUs) 124*a* and 124*b* configured to propel containerized cargo in a desired direction. PDUs 124*a* may be located in roller trays 120 and PDUs 124*b* may be located in ball mats 110. In various embodiments, PDUs 124*a* and 124*b* may be mounted inside of their own, separate structure, outside of ball mats 110 and roller trays 120. As discussed in further detail below, ball mats 110, roller trays 120, and guide rails 130 are each removably coupled to aircraft frame structures 140 via one or more quick-connect fitting(s) 150.

Quick-connect fittings 150 each include a fixed portion 152 attached to an aircraft frame structures 140 and one or more coupling component(s) 154 attached to a removable cargo handling component (i.e., attached to a ball mat 110, a roller tray 120, or a guide rail 130). In various embodiments, fixed portions 152 may include a series of seat track rails that are installed flush with panels 102 providing a similar interface as quick-connect fittings 150 in long continuous rails instead of discrete fittings. The coupling components 154 may rotate relative to, axially engage, slide in to, or form a threaded engagement with, the fixed portion 152 to secure ball mats 110, roller trays 120, and guide rails 130 to fixed portions 152 and aircraft frame structures 140. Fixed portions 152 are located within openings defined by panels 102. When convertible cargo handling assembly 100 is in a containerized mode (FIG. 2B), ball mats 110, roller trays 120, and guide rails 130 are attached to fixed portions 152. When convertible cargo handling assembly 100 is in the containerized mode, at least a portion of each ball mat 110, roller tray 120, and guide rails 130 is located on and/or overlaps surface 103 of panels 102. When convertible cargo handling assembly 100 is in a bulk mode, ball mats 110, roller trays 120, and guide rails 130 are removed from cargo compartment 12, while fixed portions 152 and panels 102 remain attached. In various embodiments, ball mats 110, roller trays 120, and guide rails 130 are secured to aircraft frame structures 140 independently of one another. Stated differently, each ball mat 110, roller tray 120, and guide rail 130 is secured via its own dedicated quick-connect fitting 150, as opposed to via a coupling to an adjacent ball mat 110, roller tray 120, and/or guide rail 130. In various embodiments, ball mats 110, roller trays 120, and/or guide rails 130 may be secured to aircraft frame structures 140 solely via quick-connect fittings 150.

In various embodiments, two of roller trays 120 may be spliced together using a slice mechanism, described in detail hereafter. In various embodiments, to control, power or otherwise communicate with components of each of the roller trays 120, wiring harnesses associated with each of the roller trays 120 may be mounted to the roller trays 120 and a mating connector on one wiring harness of a first roller tray 120 may be coupled to an associated mating connector on another wiring harness of a second roller tray 120. In various embodiments, there may be may options for the mating connectors, such as a rectangular connector or a circular connector, among others.

Figures 3A, 3B:
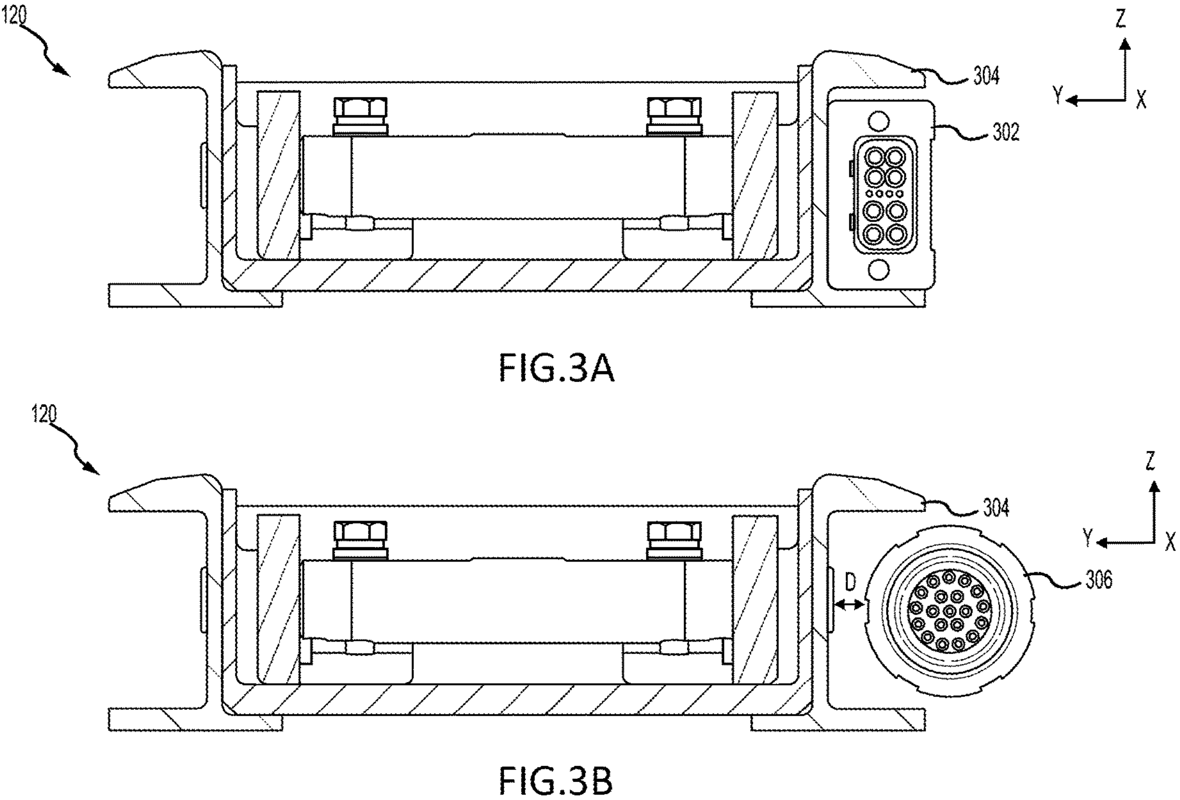
FIG. 3A illustrates a rectangular connector, in accordance with various embodiments.
FIG. 3B illustrates a circular connector in accordance with various embodiments

With regard to FIG. 3A, a rectangular connector is illustrated, in accordance with various embodiments. In various embodiments, the rectangular connector 302 may be designed to fit inside the outer profile of wall 304 of the roller tray 120. With regard to FIG. 3B, a circular connector is illustrated, in accordance with various embodiments. In various embodiments, circular connector 306 may use mounting distance D from the outer profile of wall 304 of the roller tray 120, which may expose the circular connector 306 to damage during installation, transportation, and storage. As will be discussed hereafter, in various embodiments a shield or cover is provided that attaches to the roller tray 120 to protect the connector.

Figure 4A:
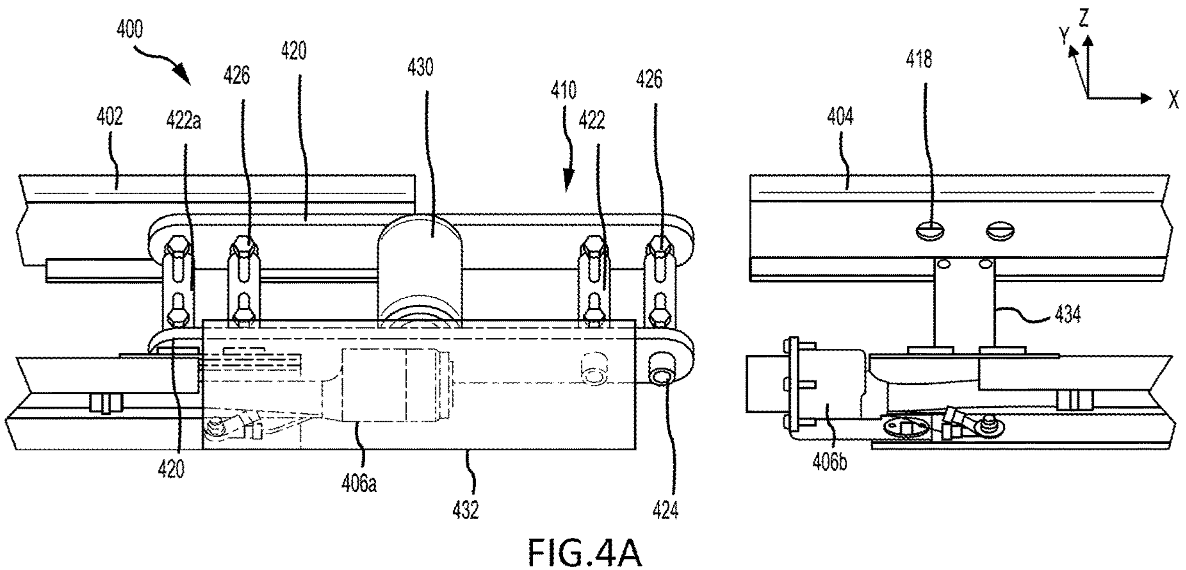
FIGS. 4A, 4B, and 4C illustrate a quick-attach splice, in accordance with various embodiments.
Figure 4B:
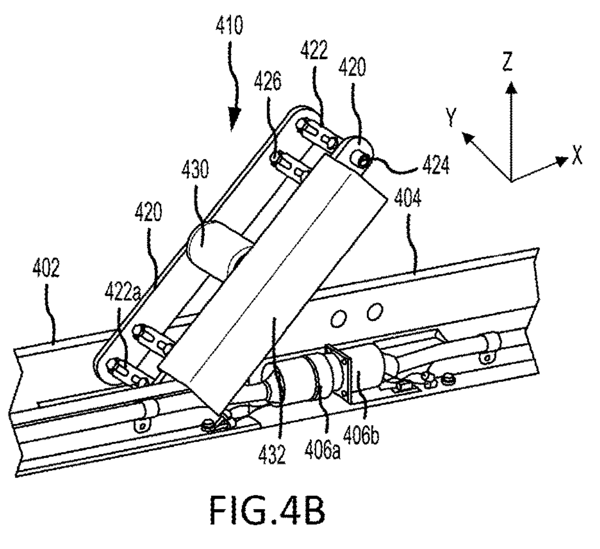
Figure 4C:
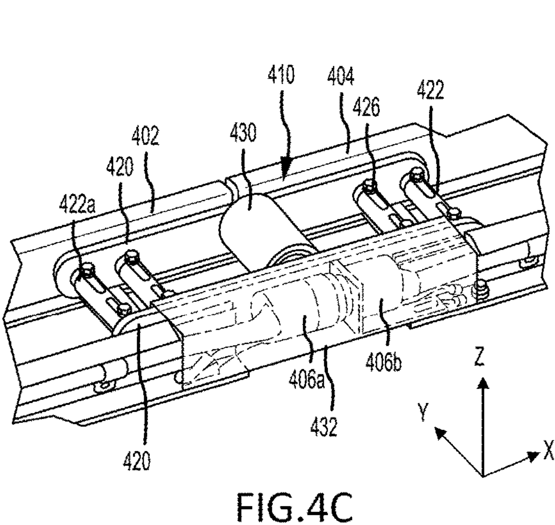

Referring now to FIGS. 4A-4C, in accordance with various embodiments, a quick-attach splice 400 is illustrated. Quick-attach splice 400 may be used in conjunction with or instead of quick-connect fittings 150 described above. As depicted, a first roller tray 402 and a second roller tray 404 are placed end to end to form a longer roller tray section in a longitudinal direction (e.g., the x-axis). First and second roller trays 402, 404 may be examples of roller trays 120 described above with respect to FIGS. 2A and 2B. Quick-attach splice 400 includes a pivoting splice 410. In FIG. 4A, the pivoting splice 410 is in an unattached lowered position. In FIG. 4B, the pivoting splice 410 is in a raised position and with first and second roller trays 402 and 404 positioned end-to-end. In FIG. 4C, the pivoting splice 410 is in an attached lowered, locked, position.

In various embodiments, pivoting splice 410 includes side rails 420, one or more cross members 422, pins 424, and tabs 426. Side rails 420 extend parallel to first and second roller trays 402 and 404 (e.g., in the x-axis). In various embodiments, cross members 422 extend between side rails 420, from one side rail 420 to the other side rail 420. In various embodiments, each pin 424 extends from within one cross member 422, through one side rail 420, and past side rail 420 (e.g., in the y-axis). In various embodiments, each pin 424 is aligned with hole 418 in each side rail 420. In various embodiments, when locked, first roller tray 402 and second roller tray 404 are firmly connected, allowing forces to pass from first roller tray 402 to second roller tray 404, and vice-versa, providing improved structural integrity and support. Additionally, in various embodiments, first roller tray 402 and second roller tray 404 may be connected using quick-attach splice 400 at any point within cargo compartment 12 and along cargo deck 18 because all connections are located within first and second roller trays 402, 404 of the quick-attach splice 400.

In various embodiments, cross member 422 further includes tabs 426. In various embodiments, tabs 426 are configured to retract pin 424 into cross member 422 when pulled toward the center of cross member 422 (e.g., in the y-direction). In various embodiments, each pair of tabs 426 may be pulled together, toward the center of cross member 422, to release the associated pins into the holes 518 or to retract the associate pins 424 from holes 418. In various embodiments, tabs 426 may be spring-loaded and biased away from the center of cross member 422, that is, away from each other. In various embodiments, this bias keeps pins 424 secured in holes 418 when locked. In various embodiments, after retracting pins 424, pivoting splice 410 may pivot about cross member 422*a* to move into the unlocked, or raised, position, as illustrated in FIG. 4B. In various embodiments, pins 424 in cross member 422*a* are secured in place by tightening, in a z-direction, tabs 426 securely to cross member 422. In various embodiments, pivoting splice 410 may be easily removed from both first and second roller trays 402, 404. In various embodiments, one or more of tabs 426 on pins 424 may be replaced with tool operated pins.

As illustrated in FIG. 4B, in various embodiments, after unlocking the quick-attach splice 400, first roller tray 402 may be removed. In various embodiments, first roller tray 402 may be moved laterally (e.g., the y-direction) or longitudinally (e.g., the x-direction) before being removed. Similarly, in various embodiments, second roller tray 404 may be moved laterally (e.g., the y-direction) or longitudinally (e.g., the x-direction) before being removed.

In various embodiments, pivoting splice 410 further includes roller 430. In various embodiments, roller 430 extends between side rails 420, from one side rail 420 to the other side rail 420. In various embodiments, the roller 430 within the pivoting splice 410 reduces roller pitch between roller in first roller tray 402 and rollers in second roller tray 404.

In various embodiments, pivoting splice 410 further includes connector shield 432. In various embodiments, the connector shield 432 may be coupled to a portion of the pivoting splice 410. In various embodiments, the connector shield 432 may be coupled to one of the side rails 420. In that regard, in various embodiments, the connector shield 432 pivots with the pivoting splice 410, thereby allowing access to the connectors 406*a* and 406*b*, such as rectangular connector 302 or circular connector 306 of FIGS. 3A and 3B, when the pivoting splice 410 is pivoted out the way and protects a connection made by connectors 406*a* and 406*b* when the pivoting splice 410 is in an attached, lowered, and locked position. In various embodiments, the connector 406*b* may be rigidly attached to the second roller tray 404 via, for example, a bracket, while the connector 406*a* moves freely for ease of coupling the connector 406*a* to the connector 406*b*. In various embodiments, tension straps 434 may be configured to couple a bottom of a one side rail 420 to the associated side rail 420 of the first roller tray 402 or the second roller tray 404 to keep the walls together during installation, transportation, and storage.

Figure 5A:
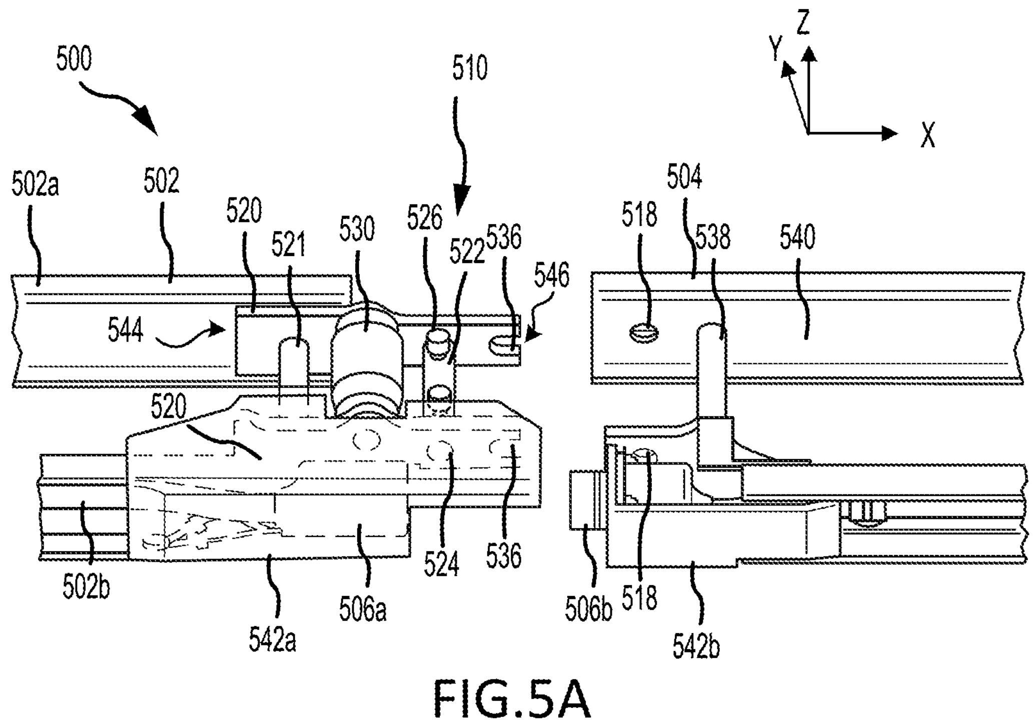
FIGS. 5A, 5B, 5C, and 5D illustrate a quick-attach splice, in accordance with various embodiments.
Figure 5B:
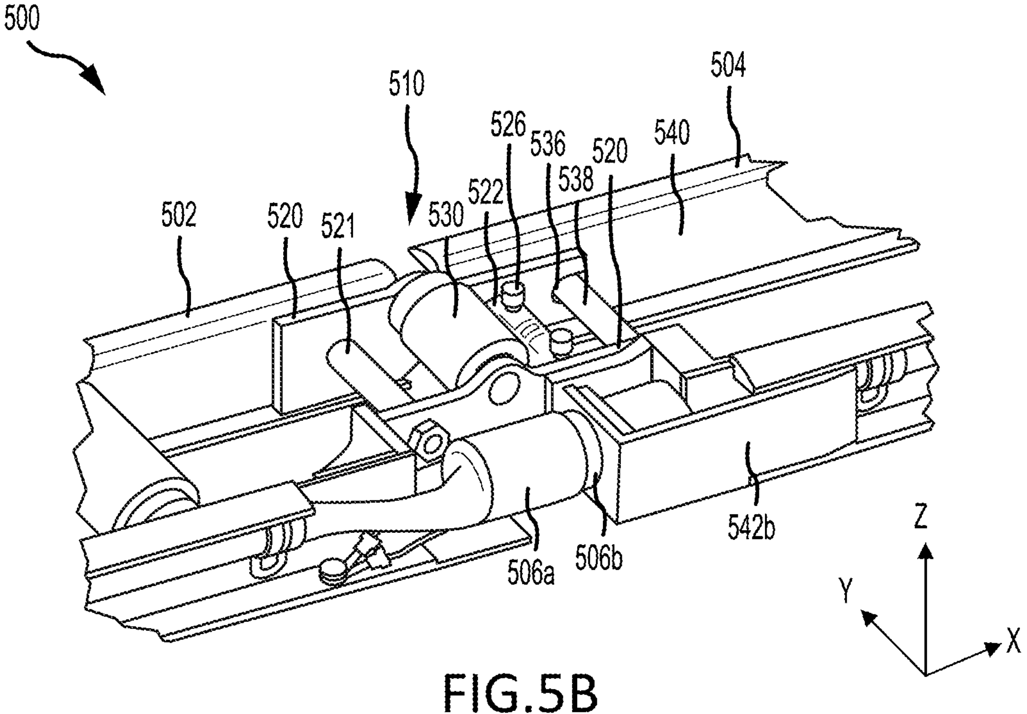
Figure 5C:
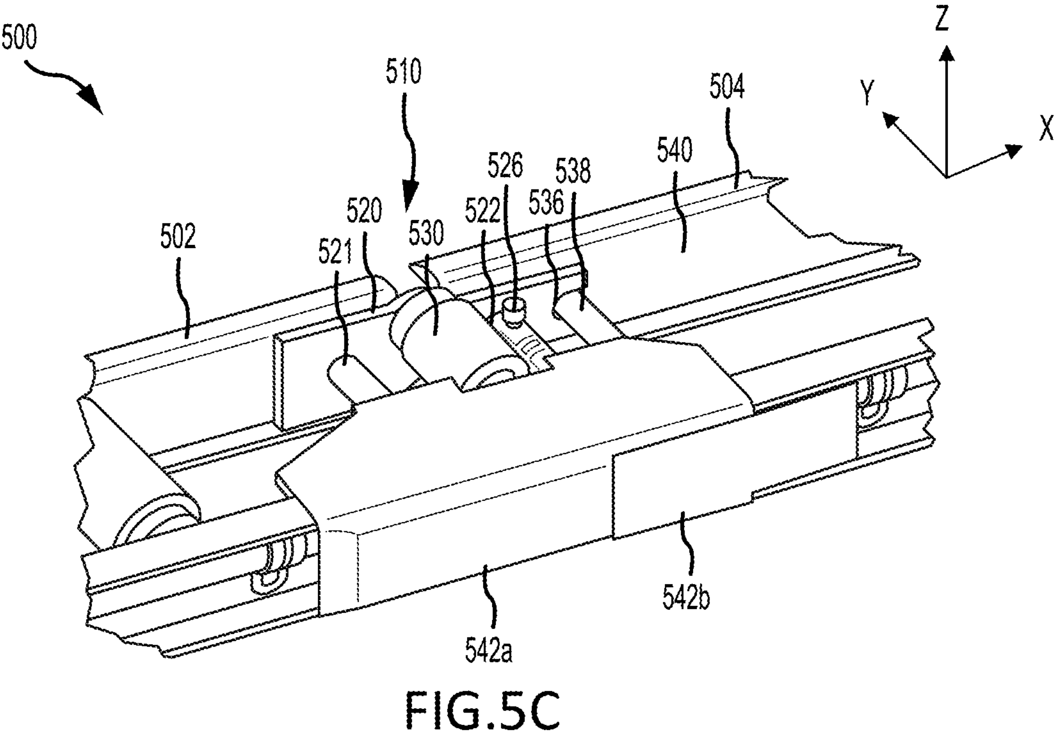
Figure 5D:
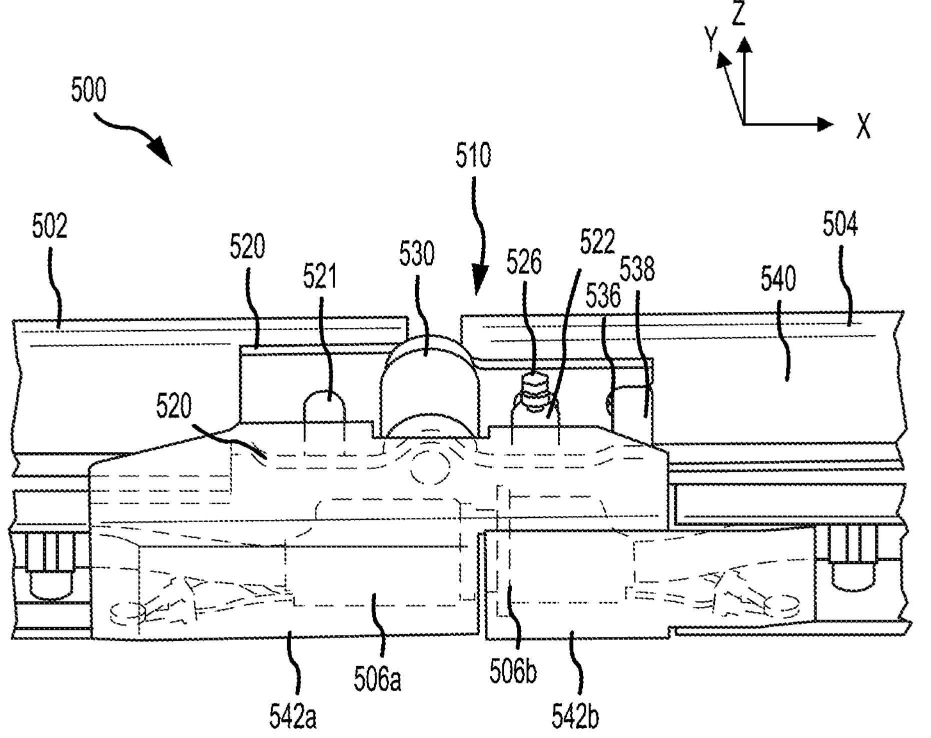

Referring now to FIGS. 5A-5D, in accordance with various embodiments, a quick-attach splice 500 is illustrated. Quick-attach splice 500 may be used in conjunction with or instead of quick-connect fittings 150 described above. As depicted, a first roller tray 502 and a second roller tray 504 are placed end to end to form a longer roller tray section in a longitudinal direction (e.g., the x-axis). First and second roller trays 502, 504 may be examples of roller trays 120 described above with respect to FIGS. 2A and 2B. Quick-attach splice 500 includes a sliding splice 510. In FIG. 5A, the sliding splice 510 is in an unattached position. In FIGS. 5B, 5C, and 5B, the sliding splice 510 is in an attached, locked, position.

In various embodiments, sliding splice 510 includes side rails 520, fixed cross member 521, pinning cross member 522, pins 524, and tabs 526. Side rails 520 extend parallel to first and second roller trays 502 and 504 (e.g., in the x-axis). In various embodiments, a proximal end 544 of sliding splice 510 may be mechanically affixed to first roller tray 502. In that regard, in various embodiments, a first side rail 520 may be mechanically affixed to a first side structure 502*a* of first roller tray 502 and a second side rail 520 may be mechanically affixed to a second side structure 502*b* of first roller tray 502.

In various embodiments, fixed cross member 521 and pinning cross member 522 extend between side rails 520, from one side rail 520 to the other side rail 520. In various embodiments, each pin 524 extends from within pinning cross member 522, through one side rail 520, and past side rail 520 (e.g., in the y-axis). In various embodiments, each pin 524 is aligned with hole 518 in each side rail 520. In various embodiments, each of the side rails 520 include a notch 536 at a distal end 546 of the side rail 520 that slidably engages with cross member 538 of second roller tray 504. In various embodiments, cross member 538 may be configured to couple one side rail 520 to the associated side rail 520 of the first roller tray 502 or the second roller tray 504 to keep the walls together during installation, transportation, and storage. In that regard, cross member 538 extends between side walls 540, from one side rail 520 to the other side rail 520 and is fixedly coupled to each of the side walls 540 of second roller tray 504. In various embodiments, when locked, first roller tray 502 and second roller tray 504 are firmly connected allowing forces to pass from first roller tray 502 to second roller tray 504, and vice-versa, providing improved structural integrity and support. Additionally, in various embodiments, first roller tray 502 and second roller tray 504 may be connected using quick-attach splice 500 at any point within cargo compartment 12 and along cargo deck 18 because all connections are located within first and second roller trays 502, 504 of the quick-attach splice 500.

In various embodiments, pinning cross member 522 further includes tabs 526. In various embodiments, tabs 526 are configured to retract pin 524 into pinning cross member 522 when pulled toward the center of pinning cross member 522 (e.g., in the y-direction). In various embodiments, each pair of tabs 526 may be pulled together, toward the center of pinning cross member 522 release the associated pins into the holes 518 or to retract the associate pins 524 from holes 518. In various embodiments, tabs 526 may be spring-loaded and biased away from the center of pinning cross member 522, that is, away from each other. In various embodiments, this bias keeps pins 524 secured in holes 518 when locked. In various embodiments, after retracting pins 524, sliding splice 410 along with first roller tray 502 may be slid away from second roller tray 504. In various embodiments, pins 524 in pinning cross member 522 are secured in place by tightening, in a z-direction, tabs 526 securely to pinning cross member 522. In various embodiments, one or more of tabs 526 on pins 524 may be replaced with tool operated pins.

In various embodiments, after unlocking the quick-attach splice 500, first roller tray 502 may be removed. In various embodiments, first roller tray 402 may initially be moved laterally (e.g., the y-direction) and then longitudinally (e.g., the x-direction). In various embodiments and depending on whether second roller tray 504 is coupled to another roller tray, second roller tray 504 may either be moved laterally (e.g., the y-direction) or longitudinally (e.g., the x-direction) before being removed if second roller tray 504 is not coupled to another roller tray or initially moved laterally (e.g., the y-direction) and then longitudinally (e.g., the x-direction) if second roller tray 504 is coupled to another roller tray.

In various embodiments, sliding splice 510 further includes roller 530. In various embodiments, roller 530 extends between side rails 520, from one side rail 520 to the other side rail 520. In various embodiments, the roller 530 within the sliding splice 510 reduces roller pitch between roller in first roller tray 502 and rollers in second roller tray 504.

In various embodiments, sliding splice 510 further includes connector shield 542*a*, 542*b*. In various embodiments, the connector shield 542*a* may be at least one of permanently or non-permanently coupled to a portion of the sliding splice 510, while connector shield 542*b* may be at least one of permanently or non-permanently coupled to a side wall 540 of second roller tray 504. In various embodiments, the connector shield 542*a* may be at least one of permanently or non-permanently coupled to one of the side rails 520. In that regard, in various embodiments, the connector shield 542*a* utilizes a slide pin or other retaining mechanism to allow the connector shield 542*a* to slide separately from sliding splice 510 thereby allowing access to the connectors 506*a* and 506*b*, such as rectangular connector 302 or circular connector 306 of FIGS. 3A and 3B. In various embodiments, the connector shield 542*a* may also be removable. In various embodiments, when the sliding splice 510 is in an unattached position and slid away from second roller tray 504, connector shield 542*a* protects connector 506*a* and connector shield 542*b* protects connector 506*b*. In various embodiments, when the sliding splice 510 is in an attached position and coupled to second roller tray 504, connector shields 542*a* and 542*b* protects a connection made by connectors 506*a* and 506*b*. In various embodiments, the connector 506*b* may be rigidly attached to the second roller tray 504 via, for example, a bracket, while the connector 506*a* moves freely for ease of coupling the connector 506*a* to the connector 506*b*.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C. B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A quick attach splice, comprising:
- a first side rail;
- a second side rail, parallel to the first side rail;
- a cross member extending from the first side rail to the second side rail;
- a first pin extending from within the cross member and through at least one of the first side rail or the second side rail;
- a tab configured to retract the first pin;
- a roller extending from the first side rail to the second side rail; and
- a connector shield, wherein the connector shield is coupled to at least one of the first side rail or the second side rail and is configured to pivot to allow access to one or more connectors when the quick attach splice is in a raised position and protect the one or more connectors when the quick attach splice is in a lowered position or is configured to slide to allow access to one or more connectors when the quick attach splice is in an unattached position and protect the one or more connectors when the quick attach splice is in an attached position.

2. The quick attach splice of claim 1, further comprising:
- a base including a first side structure and a second side structure; and
- a first hole formed in at least one of the first side structure or the second side structure and configured to receive the first pin.

3. The quick attach splice of claim 2, further comprising:
- a second cross member extending between the first side rail and the second side rail; and
- a second pin extending from within the second cross member, at least one of the first side rail or the second side rail, and into a second hole formed in at least one of the first side structure or the second side structure and configured to receive the second pin, wherein the first side rail and the second side rail pivot about the second cross member.

4. The quick attach splice of claim 1, further comprising:

a base including a first side structure and a second side structure, wherein a first proximal end of the first side rail is affixed to the first side structure and wherein a second proximal end of the second side rail is affixed to the second side structure.

5. The quick attach splice of claim 4, wherein each of a first distal end of the first side rail and a second distal end of the second side rail comprise a notch.

6. The quick attach splice of claim 4, further comprising:

a second cross member extending between the first side rail to the second side rail; and a second pin extending from within the second cross member and through at least one of the first side rail or the second side rail.

7. The quick attach splice of claim 1, wherein the tab is a spring-loaded tab biasing the first pin to an extended position.

8. The quick attach splice of claim 1, further comprising:

a second pin extending from within the cross member and through at least one of the first side rail or the second side rail of which the first pin is not extending.

9. A cargo handling system, comprising:

a first tray having a first end;

a second tray having a second end; and a quick attach splice configured to connect the first end to the second end, the quick attach splice comprising:

a first side rail;

a second side rail, parallel to the first side rail;

a cross member extending from the first side rail to the second side rail;

a first pin extending from within the cross member and through at least one of the first side rail or the second side rail;

a tab configured to retract the first pin;

a roller extending from the first side rail to the second side rail; and a connector shield, wherein the connector shield is coupled to at least one of the first side rail or the second side rail and is configured to pivot to allow access to one or more connectors when the quick attach splice is in a raised position and protect the one or more connectors when the quick attach splice is in a lowered position or is configured to slide to allow access to one or more connectors when the quick attach splice is in an unattached position and protect the one or more connectors when the quick attach splice is in an attached position.

10. The cargo handling system of claim 9, wherein the first tray comprises:

a first side structure;

a second side structure; and a first hole formed in at least one of the first side structure of the first tray or the second side structure of the first tray and configured to receive the first pin.

11. The cargo handling system of claim 10, wherein the quick attach splice further comprises:

a second cross member extending between the first side rail and the second side rail; and a second pin extending from within the second cross member, through at least one of the first side rail or the second side rail, and into a second hole formed in at least one of the first side structure or the second side structure and configured to receive the second pin, wherein the first side rail and the second side rail pivot about the second cross member.

12. The cargo handling system of claim 10, the quick attach splice further comprising:

a second cross member extending from the first side rail to the second side rail; and a second pin extending from within the second cross member, through the first side rail, and into a second hole in the second tray, wherein the first pin is configured to lock into the first tray and the second pin is configured to lock into the second tray.

13. The cargo handling system of claim 9, wherein the first tray comprises:

a first side structure; and a second side structure, wherein a first proximal end of the first side rail is affixed to the first side structure of the first tray and wherein a second proximal end of the second side rail is affixed to the second side structure of the first tray.

14. The cargo handling system of claim 13, wherein the second tray comprises:

a first side structure; and a second side structure, wherein each of a first distal end of the first side rail and a second distal end of the second side rail comprise a notch configured to couple to a second cross member extending between the first side rail of the second tray and the second side structure of the second tray.

15. The cargo handling system of claim 13, the quick attach splice further comprising:

a second cross member extending between the first side rail to the second side rail; and a second pin extending from within the second cross member, the at least one of the first side rail or the second side rail, and into a first hole in the second tray.

16. The cargo handling system of claim 9, wherein the tab is a spring-loaded tab biasing the first pin to an extended position.

* * * * *